Sept. 26, 1939. H. E. KEYES Re. 21,215

METHOD OF FIXING SULPHUR DIOXIDE AS SULPHURIC ACID AND FERRIC SULPHATE

Original Filed Sept. 4, 1931

INVENTOR
Harmon E. Keyes
BY
Hoguet & Meary
ATTORNEYS

Reissued Sept. 26, 1939

Re. 21,215

UNITED STATES PATENT OFFICE 21,215

METHOD OF FIXING SULPHUR DIOXIDE AS SULPHURIC ACID AND FERRIC SULPHATE

Harmon E. Keyes, Phoenix, Ariz.

Original No. 2,055,082, dated September 22, 1936, Serial No. 561,159, September 4, 1931. Renewed March 14, 1933. Application for reissue November 22, 1937, Serial No. 175,989

16 Claims. (Cl. 23—167)

This invention relates to an improved method of fixing sulphur dioxide in the form of sulphates, and, more particularly, to the fixation of sulphur dioxide in the form of sulphuric acid or ferric sulphate or mixtures of these sulphates by an improved method involving treating solutions containing ferrous sulphate with sulphur dioxide and air.

Any, or all, of the following reactions may take place when solutions of ferrous sulphate are treated with sulphur dioxide and air, depending on the factors controlling gas absorption and the relative concentration of sulphur dioxide, air, ferrous sulphate and sulphuric acid:

(a) $2FeSO_4+SO_2+O_2=Fe_2(SO_4)_3$
(b) $2SO_2+2H_2O+O_2=2H_2SO_4$
(c) $Fe_2(SO_4)_3+2H_2O+SO_2=2FeSO_4+2H_2SO_4$

It has been proposed heretofore to introduce mixtures of sulphur dioxide and air into ferrous sulphate solutions by mechanically mixing the solution with the gases or by passing the gases through a porous medium or other small orifices into the solution. Since sulphur dioxide gas may be oxidized or may act as a reducing agent itself, the prior processes have always been limited to relatively low percentages of sulphur dioxide in the air-sulphur dioxide mixture. In fact, if the percentage of sulphur dioxide exceeds approximately 4% in the mixture, the iron is reduced faster than it is oxidized, according to reaction (c). If the iron becomes entirely reduced, this reaction ceases and it is necessary to use a large excess of air to reoxidize the iron and allow the reaction to proceed. These prior processes are expensive to operate, unstable in their operations and limited in scope, and have never had extensive commercial application.

According to my invention, the sulphur dioxide, usually in the form of a mixture of sulphur dioxide and other gases, is brought into absorbing relation to the ferrous sulphate solution under conditions whereby the sulphur dioxide or $SO_2$-containing gases exist substantially as a continuous phase or atmosphere and the ferrous sulphate solution exists as a discontinuous phase; that is, it is present in more or less dispersed or disseminated form in the atmosphere of $SO_2$-containing gases during the absorption stage. Air or other oxidizing gas under pressure is then brought into absorbing relation to the resultant solution, preferably by introducing the air into a body of the solution resulting from the gas-absorption step previously mentioned, and these operations are repeated in the order named until substantially all of the ferrous iron has been oxidized to the ferric state and the sulphuric acid content of the solution has been built up to the desired extent.

I have found that by thus repeatedly bringing the liquid into absorbing relation to sulphur dioxide and then into absorbing relation to air, the rate of acid formation is increased and the acid content of the solution may be built up to a much greater extent than in the prior processes.

One of the advantages of my invention is the utilization of impure sulphurous gases, such as roaster gases, containing 1% to 14% of sulphur dioxide and varying amounts of sulphur trioxide, oxygen, carbon dioxide, nitrogen and flue dust. It is further possible to use this impure gas without pretreatment of any kind. Such gases do not lend themselves readily to treatment by methods of $SO_2$-gas absorption involving injection of the gas beneath the surface of a body of the absorbing solution. In the first place, in order to secure adequate $SO_2$ absorption with a dilute $SO_2$-containing gas, it is necessary to inject or blow the gas into the solution under a head of several feet, and this definitely requires gas-pump blowers of the positive pressure type which operate with close clearances. Owing to the necessity of handling large volumes of gases, a preponderating part of which may be inert or take no useful part in the process, the power costs of injecting the gases under the pressures required are considerable. Secondly, when dealing with impure gases such as roaster gases difficulties such as corrosion and sticking arise due to the corrosive nature of the gases and solid impurities contained therein. My invention has the advantage that the impure gases may be introduced at substantially atmospheric pressure, their movement to and through the absorption zone being conveniently effected by the use of ventilating type blowers which are cheap as compared with gas pumps and operate with such large clearances that dust and soot cannot interfere.

My process may conveniently be carried out in the apparatus shown in the accompanying drawing. This apparatus is described and claimed in my co-pending application Serial No. 561,160 (now U. S. Patent No. 1,952,675). It will be understood that the process may be carried out with the use of various types of apparatus other than that disclosed.

Figure 1:
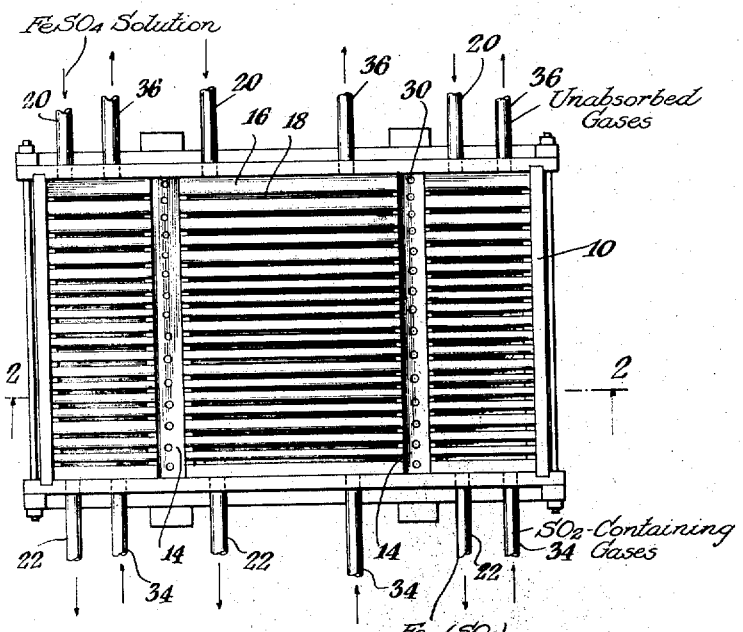
Fig. 1 is a plan of the apparatus with the cover removed.
Figure 2:
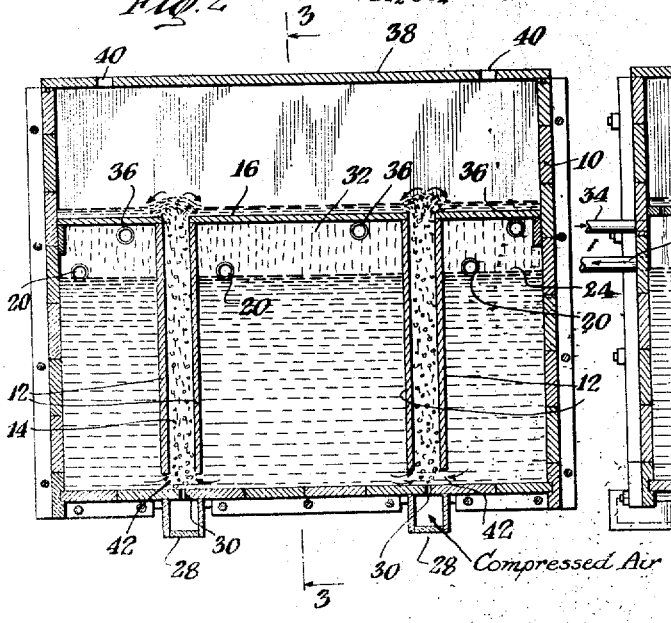
Fig. 2 is a sectional elevation taken on the line 2—2 of Fig. 1.
Figure 3:
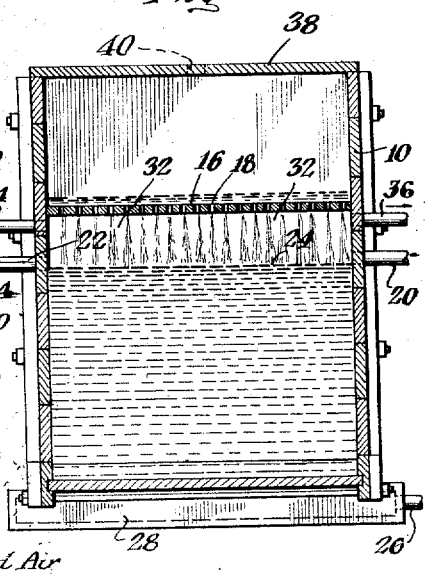
Fig. 3 is a sectional elevation taken on the line 3—3 of Fig. 2.

In its essential features, the regenerator consists of a container 10, having vertical partitions 12, which form one or more air lifts 14. A horizontal grating 16 is provided with slots 18. The container 10 may be provided with a cover 38 having vents 40.

In operation, the ferrous sulphate solution is fed into the regenerator cell through the pipes 20 and the solution resulting from the treatment leaves through the pipes 22, thus maintaining the liquid level as at 24. Air under sufficient pressure to overcome the hydrostatic head of the liquid is introduced through the pipe 26 by means of a blower not shown, passes through the header 28 and through the openings 30 into the liquid at the base of the air lifts 14. The liquid is raised by this means and overflows onto the grating 16 and passes through the slots 18, whence it passes in the form of small streams, sheets or cascades through the gas filled space 32. It will be noted from the drawing that the body of liquid supported by the grating 16 is of a definite and appreciable depth. Likewise the drawing clearly discloses that the slots 18 extend the full distance between the respective air lift chambers 12 and between such chambers and the side walls of the tank. Furthermore it will be noted that the slots 18 are of a substantial width. Consequently, the sheets or cascades are substantially continuous between the air lift chambers and between such chambers and the wall of the tank; and also these sheets or cascades are relatively thick by virtue of the width of the slots. Likewise the depth of the liquid upon the grating 16 imparts an initial velocity to the cascades as they fall into the absorption chamber. These streams, sheets or cascades impinge on to the surface 24 of the main body of the liquid. Openings 42 from the main body of the liquid in the regenerator to the air lifts are provided so that the liquid may be circulated repeatedly through the air lifts 14 and the gas chamber 32 before passing out of the cell at 22. The gas containing sulphur dioxide is introduced through pipes 34 and is drawn out of the cell through pipes 36 by means of a suction fan not shown. The sulphur dioxide gas is thus brought into intimate contact with many streams of liquid falling through the space 32 onto the surface of the liquid.

In an actual operation using this type of apparatus, the sulphur dioxide gas contained 10% sulphur dioxide and the solution fed to the apparatus contained 10 lbs. per ton of iron in the ferrous condition. Air under super-atmospheric pressure was introduced into the air lifts in amount sufficient for rapid circulation of the liquid. After six hours' treatment 98% of the iron was oxidized to the ferric condition and 67 lbs. of sulphuric acid per ton of solution was produced.

By properly adjusting the volume of sulphur dioxide gas to the volume of solution passing through the apparatus, it is possible to utilize over 95% of the sulphur dioxide in the production of ferric sulphate and sulphuric acid.

By employing a countercurrent flow of solution and gas advance in a continuously operated cell, the outgoing spent gas makes contact with the incoming ferrous sulphate solution, thereby resulting in a high degree of absorption of sulphur dioxide. At the other end of the cell, the outflowing ferric sulphate-sulphuric acid solution makes contact with the strong incoming sulphur dioxide gas. If it is desired to produce only sulphuric acid, the ferric sulphate may be entirely reduced by introducing a highly concentrated sulphur dioxide gas, or a greater proportion of gas to solution into the outgoing solution. This may be accomplished in the regenerator cell proper or in a separate absorption system into which the strong gas and the outgoing solution are introduced countercurrently and the exit gas from the absorption system is introduced into the regenerator cell. This reaction (c) not only reduces the iron, but produces sulphuric acid.

It will be understood that in the normal operation of the process starting with a ferrous sulphate solution, the ferrous sulphate is first converted to ferric sulphate, sometimes practically completely before much acid is formed. Thereafter, during the course of a given operation according to my process, the iron present in the solution will be largely in the ferric state, and in many cases there is hardly any trace of ferrous iron in the solution after the initial oxidation. Whether this may be explained on the ground that the reaction producing sulphuric acid is catalytic with respect to ferric iron or on other grounds, I am not prepared to state definitely. It has been proposed heretofore to use ferric sulphate solutions when aiming to fix sulphur dioxide as sulphuric acid, see Bureau of Mines Bulletin 260, pages 19–21, and therefore, I am not making any claim to novelty of the use of such a solution except when used in the manner recited in this specification and the appended claims. The term "iron sulphate" is used in this specification and the appended claims in the general sense to mean ferrous sulphate and ferric sulphate or mixtures of these salts.

Among the advantages of my method over former methods are the following: Sulphur dioxide of any strength may be used at atmospheric pressure and because of the stronger sulphur dioxide gas that it is possible to use, the rate of acid formation is considerably greater than in previous methods; the alternate absorption of sulphur dioxide in the solution and the oxidation of the sulphur dioxide in the presence of iron sulphate increases the rate of acid formation; the percentage of absorption of sulphur dioxide gas is very high; the process is more stable chemically and more easily controlled and it is not subject to frequent alternately oxidizing and reducing conditions, such as were present in other methods; in a continuously operated regeneration apparatus, countercurrent flow of gas and solution advance is possible, thereby producing high efficiency of conversion of sulphur dioxide into sulphuric acid and ferric sulphate; also, as hereinbefore noted, the cost of cleaning and compressing sulphur dioxide to enable blowing it into the solution is eliminated.

While it is not essential that the air for aeration purposes shall be brought into absorbing relation to the solution by injecting the same in the manner set forth in the specific example, the introduction of the air under super-atmospheric pressure has the advantage that more oxygen is dissolved in the solution when it is under pressure. Because of this fact it is generally preferred to carry on the aeration step by injecting the air under pressure and thereby speeding up the oxidation reactions involved.

The term "substantially atmospheric pressure" as used herein is to be understood as including those small deviations from the true atmospheric pressure that may be required to effect circulation of the $SO_2$-containing gases through the gas absorption chamber. Generally a plus or minus pressure of a few inches will suffice to effect the desired flow thus permitting the use of ventilating fans and similar low pressure type blowers. The pressure may closely approach the true atmospheric if the absorption chamber is appropriately designed.

When dealing with impure $SO_2$-containing gases such as roaster gases, the maximum advantages from the economic standpoint are derived by maintaining the gases in the gas absorption step at substantially atmospheric pressure. However, it will be understood that my invention is not limited to operations carried on with the gases at any particular pressure.

It will be understood that various changes may be made in the details of the procedures involved without departing from the invention, which is not to be deemed as limited other than as set forth in the appended claims.

I claim:

1. The method of producing a solution containing ferric sulphate and sulphuric acid which comprises passing a ferrous sulphate-containing solution in disseminated form through an atmosphere of sulphur dioxide-containing gases under pressure conditions in such atmosphere substantially the same as those of atmospheric air, thereby absorbing sulphur dioxide into the solution; collecting the solution and passing air through said solution in an amount sufficient to insure the fixation of the sulphur dioxide absorbed in such solution in the form of ferric sulphate and sulphuric acid, and repeating the stated operations until the desired concentration of sulphuric acid and ferric sulphate is built up.

2. The method of producing a solution containing ferric sulphate and sulphuric acid which comprises passing sulphur dioxide-containing gas as a continuous phase and under pressure conditions approximating those of atmospheric air through an absorption zone while passing a ferrous sulphate-containing solution through said zone as a discontinuous phase, thereby absorbing sulphur dioxide into the solution; collecting the solution into a body; injecting air into said body of solution, and recirculating the solution between said body and said zone until the desired concentration of sulphuric acid and ferric sulphate is built up.

3. The method of producing a solution containing ferric sulphate and sulphuric acid which comprises passing a ferrous sulphate-containing solution in disseminated form through an atmosphere of sulphurous gases derived from a roasting operation and containing from 1% to 14% of sulphur dioxide and varying amounts of sulphur trioxide, oxygen, carbon dioxide and nitrogen, under pressure conditions in said atmosphere substantially the same as those of atmospheric air, thereby absorbing sulphur dioxide into the solution; collecting the solution and passing air through said solution in an amount sufficient to insure the fixation of the sulphur dioxide absorbed in said solution in the form of ferric sulphate and sulphuric acid, and repeating the stated operations until the desired concentration of sulphuric acid and ferric sulphate is built up.

4. The method of producing a solution containing ferric sulphate and sulphuric acid which comprises establishing a body of solution containing ferrous sulphate, passing a stream of gases containing sulphur dioxide through a space above and in free communication with said body of solution, raising a portion of said solution above the normal level thereof and causing it to fall in small streams through said gas space into said body of solution to absorb sulphur dioxide, and injecting air into said body of solution under super-atmospheric pressure, and repeating the stated operations until the desired concentration of sulphuric acid and ferric sulphate is developed in said solution.

5. The process of producing a solution containing ferric sulphate and sulphuric acid which comprises establishing a body of solution containing ferrous sulphate, passing a stream of gas containing sulphur dioxide through a space above and in free communication with said body of solution, injecting air under super-atmospheric pressure into a partially isolated portion of said body of solution and thereby causing a portion of said solution to be lifted above the normal level of said body, then causing said lifted solution to cascade through said gas space into said body of solution to absorb sulphur dioxide and repeating the stated operations until the desired concentration of sulphuric acid and ferric sulphate is developed in said solution.

6. The method of fixing $SO_2$ as sulphuric acid which comprises disseminating a solution containing iron in sulphate form in an atmosphere of sulphur dioxide-containing gases under pressure conditions in said atmosphere substantially the same as those of atmospheric air, thereby absorbing sulphur dioxide into the solution; collecting the solution, bringing air under super atmospheric pressure into absorbing relation to said solution in an amount sufficient to insure fixation of the sulphur dioxide, and repeating the stated operations until the desired concentration of sulphuric acid is built up.

7. In a method of producing sulphuric acid by absorbing sulphur dioxide and oxygen in ferrous sulphate solutions, the steps which comprise establishing a body of solution containing ferrous sulphate, passing a stream of gases containing sulphur dioxide through a space above and in free communication with said body of solution, raising a portion of said solution above the normal level thereof and causing it to fall in cascade formation into said body of solution to absorb sulphur dioxide from said gases, injecting air under super-atmospheric pressure into said solution in an amount sufficient to insure the fixation of the sulphur dioxide absorbed in said solution, repeating the stated operations until the iron content of said solution has been substantially converted to ferric sulphate, and finally reacting the ferric sulphate to ferrous sulphate and sulphuric acid by treating the solution with gases containing a high percentage of sulphur dioxide as compared with the sulphur dioxide-containing gases used in the earlier stage of the process.

8. In a method of producing sulphuric acid by absorbing sulphur dioxide and oxygen in ferrous sulphate solutions, the steps which comprise establishing a body of solution containing ferrous sulphate, passing a stream of gases containing sulphur dioxide through a space above and in free communication with said body of solution, raising a portion of said solution above the normal level thereof and causing it to fall in cascade formation into said body of solution to absorb sulphur dioxide from said gases, then bringing said solution in gas absorbing relation to air under super-atmospheric pressure, repeating the stated operation until the iron content of said solution has been substantially converted to ferric sulphate, and finally reacting the ferric sulphate to ferrous sulphate and sulphuric acid by treating the ferric sulphate solution with sulphur dioxide-containing gases in such amount and of such strength that the proportion of sulphur dioxide contacted with said solution in a given interval is relatively high as compared with the proportion maintained in the earlier stage of the process.

9. The method of producing sulphuric acid which comprises passing a ferrous sulphate-containing solution in disseminated form through an atmosphere of gases containing sulphur dioxide under pressure conditions in said atmosphere substantially the same as those of atmospheric air thereby absorbing sulphur dioxide into the solution; bringing an oxygen-containing gas under super atmospheric pressure into absorbing relation to the resulting solution, thereby converting the iron content of said solution to ferric sulphate; and finally reacting the ferric sulphate to ferrous sulphate and sulphuric acid by treating the solution with gases containing a relatively high percentage of sulphur dioxide as compared with the gases used in the first step of the process.

10. The method of fixing $SO_2$ as sulphuric acid and ferric sulphate which comprises passing a ferrous sulphate-containing solution in cascade formation through a zone containing an atmosphere of $SO_2$-containing gases into a body of said solution, thereby absorbing $SO_2$ into the solution, passing air through said body of solution to fix the $SO_2$ absorbed therein in the form of ferric sulphate and sulphuric acid, and recirculating the solution between said body and said zone until the desired concentration of sulphuric acid and ferric sulphate is built up.

11. The method of fixing $SO_2$ as sulphuric acid and ferric sulphate which comprises passing a ferrous sulphate-containing solution in dispersed form through a zone containing an atmosphere of $SO_2$-containing gases, thereby absorbing $SO_2$ into the solution, collecting the solution into a body, injecting air into said body of solution to fix the $SO_2$ absorbed therein and to induce recirculation of portions of said solution between said body and said zone, and repeating the stated operations until the desired concentration of sulphuric acid and ferric sulphate is built up.

12. The method of fixing $SO_2$ as sulphuric acid which comprises passing an iron sulphate-containing solution in dispersed form through a zone containing an atmosphere of sulphur dioxide-containing gases into a body of said solution adjacent thereto, thereby absorbing the $SO_2$ into the solution; bringing air under super atmospheric pressure into absorbing relation to said solution to fix the $SO_2$ absorbed in such solution, and repeating the stated operations until the desired concentration of sulphuric acid is built up.

13. The method of fixing $SO_2$ as ferric sulphate which comprises passing a ferrous sulphate-containing solution in cascade formation through a zone containing an atmosphere of $SO_2$ containing gases into a body of said solution, thereby absorbing $SO_2$ into the solution, passing air through said body of solution to fix the $SO_2$ absorbed therein in the form of ferric sulphate, and recirculating the solution between said body and said zone until the desired concentration of ferric sulphate is built up.

14. A method of absorbing $SO_2$ in an iron-bearing solution comprising establishing a body of the solution, establishing a second body of the solution above the first mentioned body thereby forming a gas absorption chamber between the two solution bodies, permitting the solution in the second body to fall into the first body in a sheet-like formation, the second body being of such depth that the said falling solution sheet is given an initial velocity into the absorption chamber and a substantial gas seal effected across the top of said gas absorption chamber, the falling solution impinging as a definite sheet of substantial thickness into the first body, and passing the $SO_2$ to be absorbed through the said chamber and into the sheet intermediate the first and second bodies of solution.

15. A method of absorbing $SO_2$ gas in an iron-bearing solution, comprising establishing a body of the solution, withdrawing a portion of said solution and elevating it to form a second body above the first-mentioned body, permitting the solution in the second body to fall back into the first body in continuous sheet-like streams, the second body being of such depth and the streams of such thickness that the streams of solution forcibly impinge on the surface of the first body as definite sheets extending between the said bodies, and concomitantly passing the $SO_2$ gas through the zone through which the streams fall and into the sheet-like streams, and repeating the operation until the desired degree of absorption is obtained.

16. A method of absorbing $SO_2$ gas and oxygen in an iron-bearing solution, comprising establishing a body of the solution, withdrawing a portion of said solution and elevating it to form a second relatively substantial body above the first-mentioned body, causing the solution in the second body to fall back into the first body in a definite sheet-like formation, the second body being of such depth and the sheet-like formation of such volume that the sheet of solution impinges on the first body in a substantially unbroken and continuous sheet between the said bodies and passing a gas containing $SO_2$ and oxygen through the zone intermediate the first and second bodies and into the sheet-like formation at substantially right angles thereto.

HARMON E. KEYES.